Patented Aug. 10, 1926.

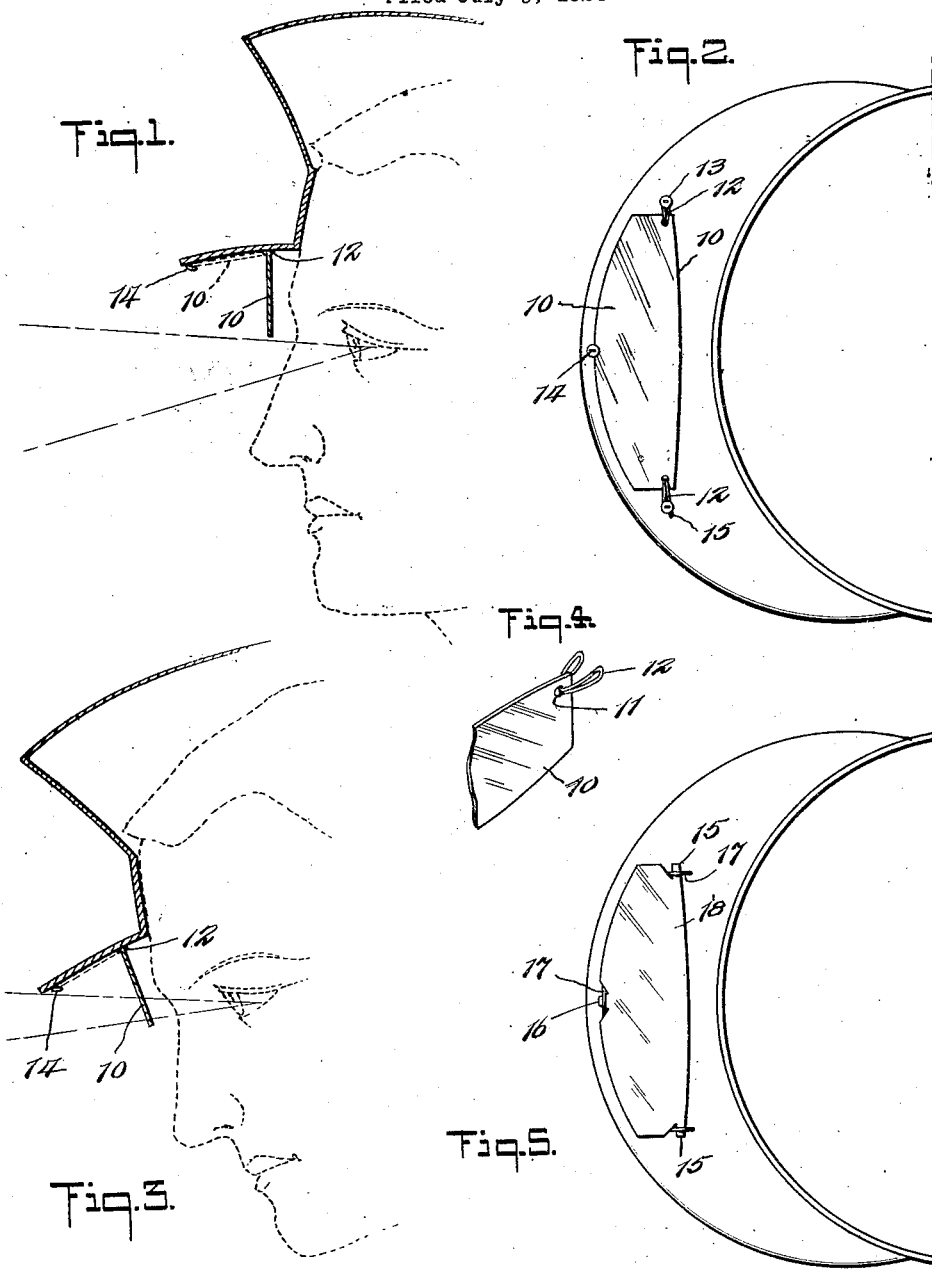

1,595,442

UNITED STATES PATENT OFFICE.

CHARLES D. ALLEN, OF SOUTHINGTON, CONNECTICUT.

GLARESHIELD.

Application filed July 5, 1924. Serial No. 724,275.

Among the principal objects which the present invention has in view are: to provide means for shielding the eyes of the driver of a vehicle from the direct rays of automobile headlights in traffic; to adapt the shield for temporary service installation; to provide a shield which can be commercially handled as an accessory; and to cheapen and simplify the construction.

Drawings.

Figure 1 is a sectional view of a shield of the character mentioned, constructed and arranged in accordance with the present invention, the same being shown in conjunction with an automobile driver's cap.

Figure 2 is a view showing on enlarged scale, the underside of the visor of an automobile driver's cap equipped with a shield, constructed and arranged in accordance with the present invention and disposed in its inactive position.

Figure 3 is a view similar to Figure 1, illustrating the method of employing the shield in service.

Figure 4 is a detailed view on enlarged scale showing one of the devices employed to temporarily install the shield in service.

Figure 5 is a view showing the underside of a cap visor and a shield mounted thereon, said shield being held inactively, said shield being constructed and arranged in accordance with the modified form of the invention.

Description.

As seen in the drawings, the shields 10 are preferably provided at the ends thereof and adjacent the upper edge thereof with perforations 11 through which small rubber bands 12, or similar devices may be extended. The shields 10 are preferably constructed of celluloid colored to soften white and intense light when passed therethrough.

In service the shields are disposed as seen best in Figure 2 of the drawings, the loops of the rubber bands 12 being passed over the buttons 13. The rubber bands 12 serve to support the shields 10 whether in dropped position as shown in Figure 1 of the drawings, or in the raised position shown in Figure 2 thereof. In the latter position, however, a button 14 cooperates with the bands 12 to permit the extension thereunder of the edge of the shield to assist in supporting the same in the raised position shown by dotted lines in Figure 1 of the drawings.

The modified form shown in Figure 5 of the drawings differs from the preferred form only in that the shield 18 is provided with end lugs 15 and a central lug 16. Elastic loops 17 provided on the visor of the cap engage these lugs to hold the same in active or inactive positions. When supported in the inactive position, the lug 16 is engaged by the loop 17 arranged therefor. When in active position, the lug 16 is released from engagement with the loop 17 and allowed to drop into the position shown in Figures 1 and 3.

It will be noted that the shields 10 and 18 are half width, or of a width sufficient, as shown in Figure 1 of the drawings, to extend just above the line of vision of the driver, when the head is held erect. When, however, the head is bent forward, as shown in Figure 3 of the drawings, the line of vision is through the shield when looking forward. In this manner the glare of oncoming headlights is seen by the driver through the shield and is softened or partially obscurated thereby.

While I have herein described the shield 10 as being constructed of celluloid, it will be understood that any other material may be employed.

Also it will be understood that while I have described the shield as constructed of a single piece or single thickness of the material forming the shield, a combination of different layers or of a variety of colors may be employed on the one shield to vary the obscuration thereof, and in this way provide for protecting the eyes of the driver against lights of oncoming vehicles of various intensities.

Claim.

The combination with a vizored headwear, of an eye shield, said shield being notched to provide lugs formed at opposite side edges thereof and flush with the edges, loops of elastic material secured to the vizor of said headwear and passed over said lugs to retain said eye shield in pivotal susupension on said vizor, a lug cut in said shield at the outer edge thereof and flush with said edge, and a retaining loop carried by said vizor adjacent its outer edge for engagement over said last named lug to retain said shield in raised position.

CHARLES D. ALLEN.